Dec. 13, 1938.  C. W. CRUMRINE  2,139,728
SHUTTER ACTUATING ARRANGEMENT FOR FOLDING CAMERAS
Filed June 4, 1937
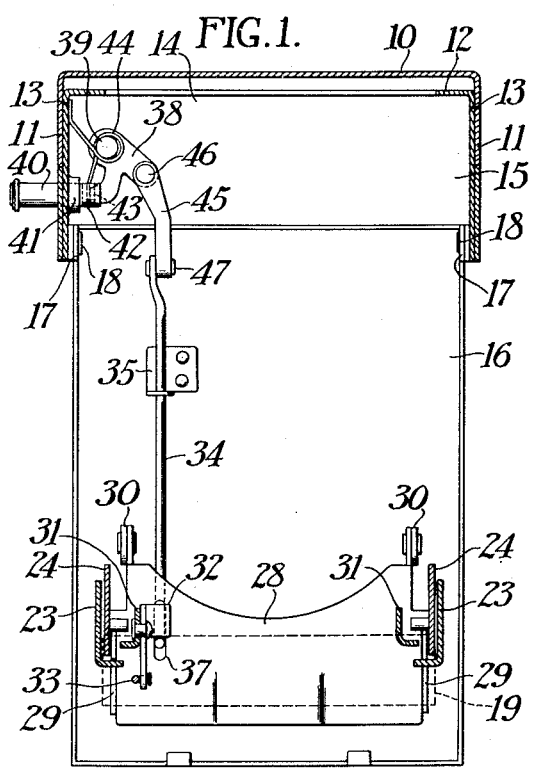
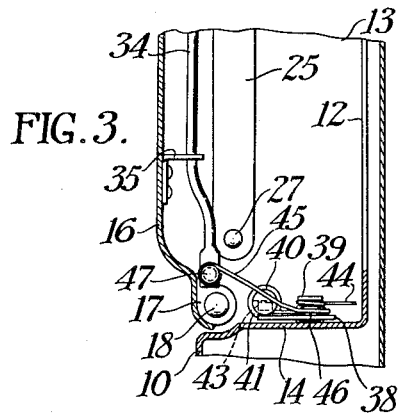
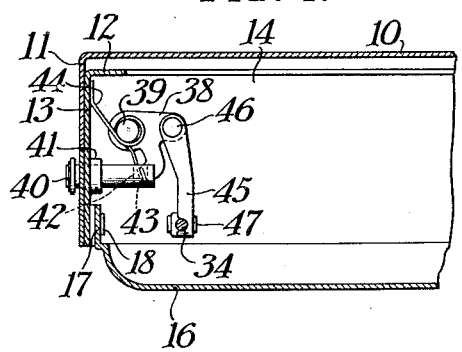
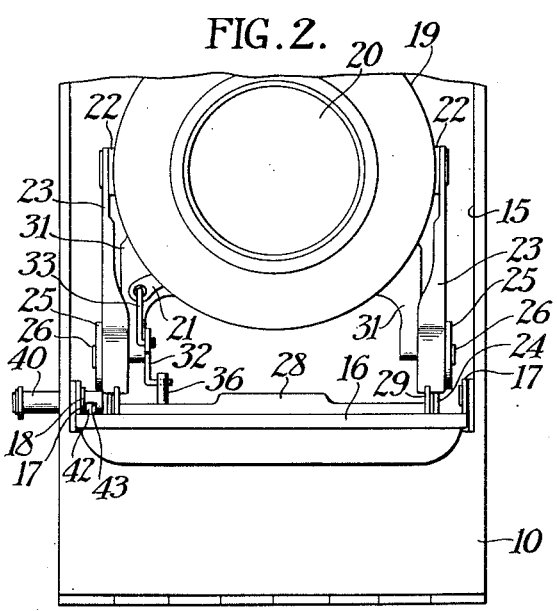
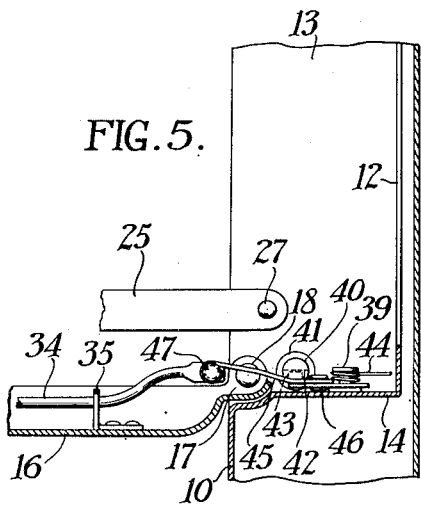
Chester W. Crumrine
INVENTOR
ATTORNEYS Patented Dec. 13, 1938

2,139,728

UNITED STATES PATENT OFFICE 2,139,728

SHUTTER ACTUATING ARRANGEMENT FOR FOLDING CAMERAS

Chester W. Crumrine, Rochester, N. Y., assignor to Eastman Kodak Company, Rochester, N. Y., a corporation of New Jersey Application June 4, 1937, Serial No. 146,435

7 Claims. (Cl. 95—53)

The present invention relates to a shutter actuating means for a folding camera and more particularly to an actuating means including a finger member on the camera body and automatically retracted and ejected with closing and opening of said folding camera.

Shutter actuating mechanisms controlled from the camera body are known and it is also recognized that the finger member of such actuating mechanisms may be automatically moved with respect to the camera body when the camera is moved to open and closed positions. The known shutter actuating mechanisms include some additional operating means for retracting and ejecting the finger member on the camera body.

The primary object of the present invention is the provision of a shutter actuating mechanism for a folding camera which causes automatic retraction and extension of the finger member with closing and opening of the camera by mere arrangement of the elements comprising said shutter actuating mechanism.

A further object of the invention is the provision in a shutter actuating mechanism of an actuator rod which is moved longitudinally of the folding bed of the camera to actuate the operating arm of a shutter assembly.

Other and further objects of the invention will be apparent to those skilled in the art from the following description.

The above and other objects of the invention are attained in a shutter actuating mechanism for a folding camera wherein the articulated connection between the actuator rod on the folding bed and the manually operable means on the camera body is displaced with respect to the hinged axis for the folding bed so that movement of said folding bed to closed position automatically causes retraction of the finger member toward the camera body and vice versa movement of the folding bed to open position automatically extends or ejects said finger member from the camera body.

Reference is hereby made to the accompanying drawing wherein similar reference characters designate similar elements and wherein:

Fig. 1 is a plan view of a folding camera with the bed in open position and showing the shutter actuating mechanism of the invention.

Fig. 2 is a front elevation of a folding camera with the bed open and equipped with my improved shutter actuating mechanism.

Fig. 3 is a vertical fragmentary cross section through the folding camera with the bed in closed position.

Fig. 4 is a fragmentary transverse cross section through the folding camera with the bed in closed position and showing the finger member in retracted position.

Fig. 5 is a fragmentary vertical cross section similar to Fig. 3 but showing the folding bed in open position.

The shutter actuating mechanism of the invention is advantageously employed in connection with a photographic camera including a camera body, a folding bed, and a shutter assembly carried by the folding bed.

The camera body comprises a casing 10 having side walls 11 and an inner frame member 12 having side flanges 13 adjacent side walls 11 of casing 10 and including a horizontal mechanism plate 14. Said inner frame member 12 provides within the camera body a chamber 15 into which the shutter assembly may be folded.

The folding bed comprises a bed plate 16 which has ears 17 pivotally connected by rivets 18 to the side flanges 13 and side walls 11 of the camera body. When bed plate 16 is rotated from the open position shown in Figs. 1, 2 and 5 to the closed position shown in Figs. 3 and 4, said bed plate 16 encloses the chamber 15.

The shutter assembly comprises a photographic shutter 19 including a photographic objective 20 and having a shutter operating arm 21. The shutter 20 is provided with a pair of ears 22 which are pivotally connected to side supports 23. Uprights 24 are fastened to bed plate 16 and are pivotally connected to side supports 23. A pair of side braces 25 are pivotally connected at their forward ends to side supports 26 by rivets 26 and at their rear ends to the side flanges 13 and side walls 11 of the camera body by rivets 27.

A locking member 28 includes jaws 29 and is pivotally supported from bed plate 16 by journals 30.

The shutter assembly also includes a pair of depending arms 31. A bell crank 32 is pivotally mounted on one of said arms 31 and has one end connected by a link 33 to the shutter operating arm 21.

The camera details thus far described are quite conventional and those skilled in the art will readily understand that upon release of locking member 28 the bed plate 16 may be rotated to a closed position at the same time causing side supports 23 and side braces 25 to hold the shutter assembly substantially parallel to the camera body during its movement into the chamber 15 whereupon said shutter assembly and connected linkages are enclosed by bed plate 16. It will also be recognized that the bed plate 16 is in perpendicular relation to the shutter 19 when in open position but is substantially parallel to the shutter when in closed position.

The shutter actuating mechanism comprises a member movable along the folding bed and a manually operable means on the camera body. An actuator rod 34 extends longitudinally of bed plate 16, is mounted for longitudinal movement with respect to said bed plate 16 by a guide member 35. An upright portion 36, see Fig. 2, of actuator rod 34 extends through an elongated opening 37 in locking member 28 for engagement with the bell crank 32 which is connected to shutter operating arm 21. It is obvious that longitudinal movement of actuator rod 34 will rotate bell crank 32 and actuate shutter operating arm 21 for operation of the shutter 19. When the folding bed 16 is closed, the shutter assembly including operating arm 21 and bell crank 32 is moved with respect to the bed plate and upright portion 36 of actuator rod 34 so that movement of said actuator rod during such closing of the folding bed is not operative to actuate the shutter operating arm 21.

The manually operable means on the camera body may comprise a bell crank 38 pivoted by a headed stud 39 to the mechanism plate 14. A finger member 40 is slidably mounted in a bushing 41 on one side flange 13 and is axially movable with respect to the side wall 11 and side flange 13. Said finger member 40 is provided with a slot 42 which receives a fin 43 on one arm of bell crank 38 and which receives one end of a coil spring 44 encircling headed stud 39 with its other end bearing against side flange 13. Under the action of said coil spring 44 the bell crank 38 and finger member 40 are normally urged to the extended position illustrated in Figs. 1 and 2. Said manually operable means also includes a link 45 which is loosely connected by a rivet 46 to the other end of bell crank 38. The other end of link 45 is pivotally connected to actuator rod 34 by means of a pintle 47. The articulated or pivotal connection provided by pintle 47 permits the shutter actuating mechanism to be folded when the bed 16 is moved to closed position. It is also clear that coil spring 44 exerts its action through bell crank 38 and link 45 to actuator rod 34 and maintains said rod 34 normally in the position shown in Fig. 1. It is also obvious that when finger member 40 is depressed toward the camera body that bell crank 38 will be rotated and link 45 will move rod 34 longitudinally of bed plate 16 for rotation of bell crank 32 and actuation of the shutter operating arm 21. These links are all returned to the position shown in Fig. 1, upon release of finger member 40, by the coil spring 44. Therefore, it is clear that the coil spring 44 or similar resilient means could be connected to any element of the shutter actuating mechanism for accomplishment of the same function.

The actuator rod 34 and link 45 are so proportioned in length that the axis of the pivotal connection therebetween is displaced from the axis of the hinged connection for the bed plate 16 on the camera body. Such displacement is preferably forward of the axis of the hinged connection when bed plate 16 is in open position, see Figs. 1 and 5. After bed plate 16 is rotated to closed position this axis of the pivotal connection or pintle 47 moves toward the camera body to the position illustrated in Figs. 3 and 4. Such longitudinal displacement of the axis of said pivotal connection produces a thrust on link 45 to rotate bell crank 38 in a counter-clockwise direction and automatically to retract finger member 40 toward the camera body. The movement of bed plate 16 may also tend to move actuator rod 34 outwardly of bed plate 16 but the outer end of elongated opening 37 will limit such movement and compel the rearward thrust of link 45 for retraction of finger member 40.

The outstanding feature of the shutter operating mechanism herein disclosed is its simplicity. By mere arrangement of the elements of said shutter actuating mechanism automatic retraction of the finger member 40 is obtained upon movement of the bed plate 16 to closed position. It should also be noted that upright portion 36 of the actuator rod 34 is rendered inoperative with respect to bell crank 32 and shutter operating arm 21 when the bed is moved to closed position so that the automatic retraction of finger member 40 does not cause operation of the shutter 19. It is also clear that upon movement of the bed plate 16 to open position the coil spring 44 acts to eject or extend finger member 40 from the camera body and is permitted to accomplish such extension since the axis of the pivotal connection of pintle 47 is moved forwardly with respect to the camera body so that bell crank 38 may rotate in a clockwise direction.

Since the shutter actuating mechanism of the invention may be varied in detail without departing from the scope thereof, the present disclosure is to be considered in an illustrative sense and the scope of protection is defined in the appended claims.

Having now particularly described my invention what I desire to secure by Letters Patent of the United States and what I claim is:

1. In a photographic camera, the combination with a camera body, a folding bed hinged to said camera body and movable about an axis to closed and open positions, and a shutter assembly carried by said bed and including an operating arm, of an actuator rod movably mounted upon said bed and for actuating said shutter operating arm, a manually operable means on said camera body including a finger member normally extending from said camera body and including a linkage connected to said finger member, and an articulated connection between said actuator rod and said linkage in spaced relation to said hinge axis, and moved with respect to said hinge axis by said bed when it is moved to closed and open positions, such movement of said articulated connection with respect to said hinge axis respectively retracting said finger member into said camera body and extending said finger member from said camera body.

2. In a photographic camera, the combination with a camera body, a folding bed hinged to said camera body and movable about an axis to closed and open positions, and a shutter assembly carried by said bed and including an operating arm, of an actuator rod movably mounted upon said bed to actuate said shutter operating arm, a manually operable means on said camera body including a finger member normally extending from said camera body and including a linkage connected to said finger member, an articulated connection between said actuator rod and said linkage and displaced from said hinge axis, and means on said bed for restricting movement of said actuator rod during movement of said bed to closed position, and causing movement of said articulated connection with respect to said hinge axis for retraction of said finger member into said camera body.

3. In a photographic camera, the combination with a camera body, a folding bed hinged to said camera body and movable about an axis to closed and open positions, and a shutter assembly carried by said bed and including an operating arm, of guide members upon said bed, and actuator rod mounted in said guide members for longitudinal movement only and adapted to actuate said shutter operating arm, a manually operable means on said camera body including a finger member normally extending from said camera body and including a linkage operatively connected to said finger member, a pivotal connection between said actuator rod and said linkage and having an axis displaced from said hinge axis, and means on said bed for restricting movement of said actuator rod when the bed is moved to closed position.

4. In a photographic camera, the combination with a camera body, a folding bed hinged to said camera body and movable about an axis to closed and open positions, and a shutter assembly carried by said bed and including an operating arm, of guide members upon said bed, an actuator rod mounted in said guide members for longitudinal movement only and adapted to actuate said shutter operating arm, a manually operable means on said camera body including a finger member normally extending from said camera body and including a linkage operatively connected to said finger member, a pivotal connection between said actuator rod and said linkage to permit folding of said camera bed and having an axis forwardly displaced from the hinge axis of said bed, and means on said bed restricting movement of said actuator rod when the bed is closed so that such movement of the bed moves said pivotal connection rearwardly with respect to said hinge axis for retraction of said finger member.

5. In a photographic camera, the combination with a camera body, a folding bed hinged to said camera body and movable about an axis to closed and open positions, and a shutter assembly carried by said bed and including an operating arm, of guide members upon said bed, an actuator rod mounted in said guide members for longitudinal movement only and adapted to actuate said shutter operating arm, a manually operable means on said camera body including a finger member slidably mounted in said camera body and normally extending therefrom, and including a linkage operatively connected to said finger member, a pivotal connection between said actuator rod and said linkage and having an axis displaced from said hinge axis, and means on said bed for restricting movement of said actuator rod during closing of said bed.

6. In a photographic camera, the combination with a camera body, a folding bed hinged to said camera body and movable about an axis to closed and open positions, and a shutter assembly carried by said bed and including an operating arm, of guide members upon said bed, an actuator rod mounted in said guide members for longitudinal movement only and adapted to actuate said shutter operating arm, a manually operable means on said camera body including a finger member slidably mounted in said camera body and normally extending therefrom, a bell crank pivotally mounted in said camera body with one end connected to said finger member, a link operatively and loosely connected to the other end of said bell crank, and a pivotal connection between said actuator rod and said link and having an axis forwardly displaced from said hinge axis.

7. In a photographic camera, the combination with a camera body, a folding bed hinged to said camera body and movable about an axis to closed and open positions, and a shutter assembly carried by said bed and including an operating arm, of guide members upon said bed, an actuator rod mounted in said guide members for longitudinal movement only and adapted to actuate said shutter operating arm, a manually operable means on said camera body including a finger member normally extending from said camera body and including a linkage operatively connected to said finger member, a pivotal connection between said actuator rod and said linkage and having an axis displaced from said hinge axis, and a guard member on said bed adjacent said actuator rod for limiting the longitudinal movement thereof.

CHESTER W. CRUMRINE.